United States Patent
Kim et al.

(10) Patent No.: US 8,658,721 B2
(45) Date of Patent: Feb. 25, 2014

(54) ANTIFOAMING AGENT FOR VINYL CHLORIDE RESIN SLURRY

(75) Inventors: Yong Jin Kim, Jeollanam-do (KR); Kun Ji Kim, Jeollabuk-do (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/604,374

(22) Filed: Sep. 5, 2012

(65) Prior Publication Data

US 2013/0059959 A1 Mar. 7, 2013

(30) Foreign Application Priority Data

| Sep. 7, 2011 | (KR) | 10-2011-0090692 |
| Aug. 22, 2012 | (KR) | 10-2012-0091527 |

(51) Int. Cl.
  *C08K 5/526* (2006.01)
(52) U.S. Cl.
  USPC .......................................... 524/147; 524/151
(58) Field of Classification Search
  USPC .................................................. 524/147, 151
  See application file for complete search history.

(56) References Cited

U.S. PATENT DOCUMENTS

| 3,533,811 A * | 10/1970 | Clements et al. .......... 106/31.62 |
| 4,222,926 A * | 9/1980 | Mizuno et al. .................. 524/34 |
| 5,380,812 A * | 1/1995 | Lutz et al. ....................... 528/15 |
| 5,486,306 A | 1/1996 | L'Hostis et al. |
| 2004/0116561 A1 * | 6/2004 | Ikeno et al. ................... 524/115 |
| 2008/0103255 A1 | 5/2008 | Reichenbach-Klinke et al. |
| 2013/0023454 A1 * | 1/2013 | Bredsguard et al. .......... 508/496 |

FOREIGN PATENT DOCUMENTS

| CN | 101121869 | * | 2/2008 |
| JP | 2002-256018 | | 9/2002 |
| JP | 2002-348307 | | 12/2002 |
| JP | 2004-238522 | | 8/2004 |
| JP | 2005-281659 | | 10/2005 |

* cited by examiner

*Primary Examiner* — Peter Szekely
(74) *Attorney, Agent, or Firm* — McKenna Long & Aldridge, LLP

(57) ABSTRACT

Disclosed is an antifoaming agent for vinyl chloride resin slurry. The agent of the present invention may prevent generation of Fish eyes and deteriorate in production efficiency caused by slurry foams without inhibiting inherent transparency of vinyl chloride resins, in the process of preparing the vinyl chloride resins by polymerizing a monomer mixture containing vinyl chloride as a main component in a polymerization reactor.

18 Claims, No Drawings

ANTIFOAMING AGENT FOR VINYL CHLORIDE RESIN SLURRY

CROSS-REFERENCE(S) TO RELATED APPLICATIONS

The present invention claims priority of Korean Patent Application Nos. 10-2011-0090692 filed on Sep. 7, 2011 and 10-2012-0091527 filed on Aug. 22, 2012 which are incorporated herein by reference.

BACKGROUND OF THE INVENTION

1. Field of the Invention

The present invention relates to an antifoaming agent for a vinyl chloride resin slurry. More specifically, the present invention relates to an agent for preventing generation of Fish eyes and deterioration in production efficiency caused by slurry foams without inhibiting inherent transparency of vinyl chloride resins, in a case in which a reflux condenser or a heat removal apparatus such as a monomer vent is used in order to remove reaction heat, or in a case in which a specific compound is added in order to prevent slurry foams generated during serious gasification of monomers, for example, a stripping process, to remove unreacted monomers left behind after polymerization, in the process of preparing the vinyl chloride resins by polymerizing a monomer mixture containing vinyl chloride as a main component in a polymerization reactor.

2. Description of the Related Art

Recently, a method for preparing vinyl chloride resins to improve preparation efficiency, in which the size of a reactor is increased, a great amount of initiator and monomers are added at a constant volume, and a reflux condenser or liquid monomers is gasified to remove a great amount of reaction heat generated during the addition, thereby controlling the reaction using the gasification heat, is widely used.

Furthermore, a method in which hot polymerization water is directly added to a reactor in order to shorten a polymerization time by rapidly heating initially added reactants to a polymerization temperature, so-called "hot charge" is used.

A dispersant having a high saponification value is widely used as a dispersant for stabilization of monomer droplets in order to implement such polymerization. There is a problem in which the surface of vinyl chloride resins prepared using the dispersant having a saponification value has higher hydrophilicity and is readily bonded to moisture, to form slurry foams consisting of slurry and water, and the slurry foams then float to the top of the reactor.

The vinyl chloride resin that reaches the top of the reactor in the form of a mixture with water is adhered to the top of the reactor or the top of the tube of the reflux condenser which is difficult to wash. Such resin particles are not discharged and remain when not washed with water, and then participate in subsequent polymerization together with monomers. In this case, the produced re-polymerized particles have considerably low plasticizer absorbance and a possibility of having a large particle size, and are not readily melted during processing of the resins. As a result, Fish eyes are formed.

Furthermore, the foams that reach the outer wall and reflux condenser of the reactor significantly deteriorate heat transfer efficiency and decrease a normal production efficiency of the reactor to 30% or more. For this reason, it is important to prevent elevation of slurry foams during reaction in order to maintain a high preparation efficiency and a low Fish eye content of final products.

Well-known conventional methods include use of an antifoaming agent selected from one of silicone and alkylene glycol antifoaming agents and amide anti-foaming agents, and an anti-foaming agent selected from polyvinyl acetate and cellulose derivatives disclosed in Japanese Patent Publication No. 2002-256018, use of an emulsion of fatty acid glyceride and polyalkylene glycol disclosed in Japanese Patent Publication No. 2002-348307, and use of a polyether aqueous solution disclosed in Japanese Patent Publication No. 2004-238522 or Japanese Patent Publication No. 2005-281659.

The techniques developed to date use continuous addition of an additive having a low interfacial tension to water or an emulsion of the additive in a dispersant during reaction in common. These additives function to inhibit slurry foaming, but disadvantageously deteriorate transparency due to lack of miscibility (solubility) of used anti-foaming agent in a vinyl chloride resin. In particular, antifoaming agents continuously added during reaction are used in a large amount of about 200 ppm, thus having a negative effect on transparency and damaging printability.

Accordingly, there is increasing demand for research on techniques to prevent generation of Fish eyes and deterioration in production efficiency caused by slurry foams without inhibiting inherent transparency of a vinyl chloride resin.

SUMMARY OF THE INVENTION

Therefore, the present invention has been made in view of the above problems, and it is one object of the present invention to provide an antifoaming agent for a vinyl chloride resin slurry that exhibits a low Fish eye content and a high production efficiency without inhibiting inherent transparency of the vinyl chloride resin.

All of these objects can be accomplished by the present invention described below.

In accordance with one aspect of the present invention, provided is an antifoaming agent for a vinyl chloride resin slurry comprising at least one of compounds represented by Formula 1 or Formula 2 below:

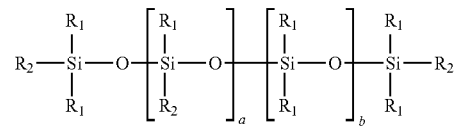

[Formula 1]

(wherein $R_1$ is an aliphatic or cycloaliphatic hydrocarbon having a $C_1$ to $C_{20}$ alkyl group, $R_2$ is independently an aliphatic or cycloaliphatic hydrocarbon having a $C_2$ to $C_{20}$ alkyl group, a is an integer of 1 to 30, which represents a polymerization degree of a structure in which $R_1$ and $R_2$ are bonded to silicon (Si), and b is an integer of 5 to 200, which represents a polymerization degree of a structure in which $R_1$ and $R_1$ are bonded to silicon (Si))

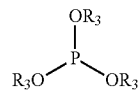

[Formula 2]

(wherein $R_3$ represents an aliphatic, cycloaliphatic or aromatic hydrocarbon having a $C_1$ to $C_{20}$ alkyl group).

DETAILED DESCRIPTION OF THE INVENTION

Hereinafter, the present invention will be described in detail.

The present invention provides an antifoaming agent for a vinyl chloride resin slurry comprising at least one compound represented by a specific formula.

One specific formula is an organosiloxane represented by the following Formula 1.

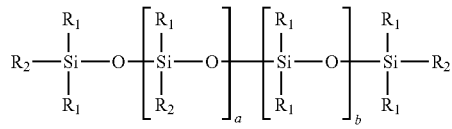

[Formula 1]

Specifically, $R_1$ represents a linear or branched structure and is represented by a formula of $C_nH_{2n+1}$ (in which n is an integer of 1 to 20).

Also, $R_2$ represents a linear or branched structure and is represented by a formula of $C_nH_{2n+1}$ (in which n is an integer of 2 to 20, more preferably, n is an integer of 4 to 18).

For reference, it is more preferable that n has an integer range of 2 to 20 in consideration of increase in solubility with a vinyl chloride resin.

Meanwhile, a that represents a polymerization degree of a structure in which $R_1$ and $R_2$ are bonded to silicon (Si) in Formula 1 is an integer of 1 to 30, preferably an integer of 1 to 15. In this case, when a is a value larger than 30, it is disadvantageously difficult to obtain sufficient solubility in a vinyl chloride resin.

Also, b that represents a polymerization degree of a structure in which $R_1$ and $R_1$ are bonded to silicon (Si) in Formula 1 is an integer of 5 to 200, preferably an integer of 10 to 100. In this case, when b exceeds 200, it is difficult to disperse the compound due to excessively increased viscosity or a solid state.

The other specific formula is organophosphate represented by the following Formula 2.

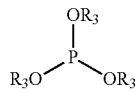

[Formula 2]

Specifically, $R_3$ represents a linear or branched structure and is represented by a formula of $C_nH_{2n+1}$ (in which n is an integer of 2 to 20, more preferably, n is an integer of 4 to 18).

For reference, it is more preferable that n has an integer range of 4 to 18 in consideration of increase in solubility in a vinyl chloride resin.

The compound of Formula 1 and the compound of Formula 2 are preferably present at a weight ratio of 10:0 to 0:1. When the compound of Formula 1 and the compound of Formula 2 are used in combination, the compounds may be used at a weight ratio of 9:1 to 3:7. As a result, although the compound is used singly, there is no difficulty in obtaining the desired aspects, but improvement in thermal stability and minimized variation in melting time can be realized via a combination of the two compounds and normal products can thus be more easily produced. In this case, when a ratio of the compound of Formula 2 is lower than a lower limit, it is difficult to improve thermal stability and when the ratio of the compound of Formula 2 exceeds an upper limit, melting time is disadvantageously shortened.

Meanwhile, the compound represented by Formula 1 and the compound represented by Formula 2 may further comprise a partially saponified polyvinyl acetate compound. When a partial saponification degree of the compound exceeds 90%, foams are generated due to excessively high hydrophilicity. For this reason, it is preferable to use a partially saponified polyvinyl acetate compound having a partial saponification degree of 90% or less. In this case, when the saponification degree is lower than 30%, it is difficult to disperse the compound in an aqueous phase and is thus difficult to obtain an anti-foaming action. For this reason, a substance preferably has a saponification degree of 60 to 80% and a weight average molecular weight (Mw) of 7,000 to 20,000.

Furthermore, when the weight average molecular weight is lower than 7,000, anti-foaming effects cannot be sufficiently exerted and when the weight average molecular weight exceeds 20,000, there is a difficulty upon use due to increased viscosity.

A weight ratio of at least one compound selected from Formula 1 and Formula 2 and the partially saponified polyvinyl acetate may be 5:1 to 1:50, in particular, 1:1 to 1:10.

In this case, when the content of the partially saponified polyvinyl acetate compound is lower than the level defined above, it is difficult to add at least one compound selected from Formula 1 and Formula 2 and it takes for a long period of time to induce anti-foaming action. On the other hand, when the content is excessively high, it is difficult to obtain the sufficient anti-foaming effect.

There is no limitation as to the antifoaming agent for the vinyl chloride resin slurry according to the present invention. As can be seen from Examples below, the antifoaming agent may be added during or after polymerization of vinyl chloride resin, or during blowing down of monomers after polymerization.

For example, in terms of polymerization conversion ratio, the antifoaming agent of vinyl chloride resin slurry according to the present invention may be added when the conversion ratio is within a range of 0 to 90%.

In particular, the antifoaming agent of the vinyl chloride resin slurry according to the present invention is effective in maintaining the thickness of the foaming layer measured during polymerization within 10% (preferably 2%) of the total volume of the reactor. Meanwhile, when the conversion ratio exceeds the value defined above, production of re-polymerization particles is disadvantageously rapidly increased.

Furthermore, as can be seen from Examples below, when the thickness of the foaming layer generated during polymerization exceeds 1% of the total volume of the reactor, the antifoaming agent of vinyl chloride resin slurry is preferably added at a predetermined content at an interval of 5 to 60 minutes, preferably at an interval of 10 to 30 minutes.

In this case, when the addition interval is excessively short, costs are disadvantageous due to excessive addition amount and when the addition interval is excessively long, it is impossible to suitably control the thickness of the foaming layer.

Also, there is no limitation as to the addition content. However, an amount may be 10 to 200 ppm (parts per hundred monomer), preferably 10 to 100 ppm, based on the vinyl chloride monomer per an input. The reason for this is that when the addition amount is excessively high, a problem associated with cost disadvantageously occurs, and when the addition amount is excessively low, it is difficult to reduce the thickness of the foaming layer to a desired level.

Furthermore, the antifoaming agent of vinyl chloride resin slurry according to the present invention may be added at a predetermined amount at a predetermined interval whenever foams are produced, and advantageously exhibits sufficient effects although added at least once.

The vinyl chloride resin antifoaming agent according to the present invention is used for polymerization, that is, known suspension polymerization in an aqueous medium, without limitation. As a dispersant used for the vinyl chloride resin, partially saponified polyvinyl acetate, methyl cellulose, ethyl cellulose, hydroxylethyl cellulose, hydroxylpropyl cellulose and other cellulose derivatives may be used. Furthermore, dispersants containing water-soluble polymers such as gelatin, emulsifiers such as sorbitan monolaurate and sorbitan monostearate may be used.

A polymerization reactor to which the antifoaming agent for the vinyl chloride resin slurry of the present invention is added may be used regardless of installation of reflux condenser. Also, a variety of water level indicators such as a float, conductivity detection, potential difference, ultrasonic, or optical level indicator to measure the thickness of the foaming layer may be used, and variation in water level by a liquid and variation in water level by the foaming layer are preferably separately detected using a conductivity detection method.

For reference, in a case in which the antifoaming agent of the vinyl chloride resin slurry according to the present invention, for example, the height of the foaming layer is measured at a distance of 10 cm using a water level indicator or the like and the thickness of foaming layer is expressed as a percentage with respect to the total height of the reactor.

When the thickness of the foaming layer is 2% or more during measurement, the antifoaming agent of vinyl chloride resin slurry is added predetermined times at an interval of 10 minutes, and the maximum thickness of the foaming layer (%) is measured to confirm antifoaming effects, as can be seen from the following Examples.

EXAMPLES

Now, the present invention will be described in more detail with reference to the following examples. These examples are only provided to illustrate the present invention and should not be construed as limiting the scope and spirit of the present invention.

Preparation Examples 1 to 14

A variety of vinyl chloride resin slurry antifoaming agents were prepared in accordance with the following Tables 1 and 2 for Examples and Comparative Examples of the present invention.

TABLE 1

| Type | Prep. Ex. 1 | Prep. Ex. 2 | Prep. Ex. 3 | Prep. Ex. 4 | Prep. Ex. 5 | Prep. Ex. 6 | Prep. Ex. 7 |
|---|---|---|---|---|---|---|---|
| Type of Formula | Formula 1 | Formula 1 | Formula 2 | Formula 2 | Formula 1 | Formula 2 | N/A (Not Applicable) |
| n in $R_1$ | 4 | 1 | — | — | 4 | — | — |
| n in $R_2$ | 8 | 4 | — | — | 12 | — | — |
| n in $R_3$ | — | — | 8 | 4 | — | 8 | — |
| a | 10 | 5 | — | — | 5 | — | — |
| b | 60 | 55 | — | — | 55 | — | — |
| Used amount of compound represented by formula (ppm) | 50 | 30 | 60 | 20 | 50 | 50 | — |
| Used amount of partially saponified polyvinyl acetate compound (ppm) | 50 | 70 | 40 | 80 | — | — | 50 |
| Hydration degree of polyvinyl acetate compound (%) | 50 | 50 | 50 | 50 | — | — | 50 |
| Mw of partially saponified polyvinyl acetate compound (g/mol) | 8,000 | 8,000 | 8,000 | 8,000 | — | — | 8,000 |

TABLE 2

| Type | Prep. Ex. 8 | Prep. Ex. 9 | Prep. Ex. 10 | Prep. Ex. 11 | Prep. Ex. 12 | Prep. Ex. 13 | Prep. Ex. 14 |
|---|---|---|---|---|---|---|---|
| Type of Formula (weight ratio, if any) | Formula 1 | Formula 1 | Formula 1:Formula 2 (5:5) | Formula 1:Formula 2 (8:1) | Formula 1:Formula 2 (2:8) | Formula 1:Formula 2 (1:9) | Formula 1 |

TABLE 2-continued

| Type | Prep. Ex. 8 | Prep. Ex. 9 | Prep. Ex. 10 | Prep. Ex. 11 | Prep. Ex. 12 | Prep. Ex. 13 | Prep. Ex. 14 |
|---|---|---|---|---|---|---|---|
| n in $R_1$ | 4 | 1 | 4 | 4 | 4 | 4 | 1 |
| n in $R_2$ | 8 | 4 | 8 | 12 | 4 | 8 | 1 |
| n in $R_3$ | — | — | 8 | 4 | 8 | 4 | — |
| a | 5 | 20 | 0 | 5 | 0 | 5 | 5 |
| b | 55 | 55 | 50 | 55 | 50 | 55 | 55 |
| Used amount of compound represented by formula (ppm) | 50 | 50 | 70 | 50 | 90 | 90 | 50 |
| Used amount of partially saponified polyvinyl acetate compound (ppm) | 50 | 50 | 30 | 50 | 10 | 10 | 50 |
| Hydration degree of polyvinyl acetate compound (%) | 70 | 50 | 50 | 50 | 50 | 50 | 50 |
| Mw of partially saponified polyvinyl acetate compound (g/mol) | 15,000 | 8,000 | 8,000 | 8,000 | 8,000 | 8,000 | 8,000 |

Examples 1 to 8 and Comparative Examples 1 to 9

25,000 kg of 70 water, 3 kg of polyvinyl acetate having a partial saponification degree of 88%, 6 kg of polyvinyl acetate having a partial saponification degree of 72%, 4 kg of polyvinyl acetate having a partial saponification degree of 55%, and 0.8 kg of hydroxymethylpropyl cellulose were added to a reactor having a volume of 70 m³ equipped with an internal reflux condenser, 14 kg of t-butylperoxy neodecanoate was added thereto as an initiator, the mixture was stirred and, at the same time, the pressure of the reactor was blown down to 60 mmHg, and 20,000 kg of a vinyl chloride monomer was added thereto.

Polymerization was performed while warm water was circulated in a jacket such that an internal temperature reached 57. The polymerization was performed until the pressure of the polymerization reactor reached 0.68 MPA, unreacted monomers began to blowing down and the blowing was continued until the pressure reached 0.11 MPA.

When the height of the foaming layer is measured at a distance of 10 cm using a water level indicator, and the thickness of foaming layer is 2% or more, the prepared antifoaming agents of vinyl chloride resin slurries were added as the Preparation Examples 1 to 14 to the reactor at an interval of 10 minutes in accordance with the number of addition mentioned in Tables 3 and 4, and the measured maximum thicknesses of the foaming layer (%) are summarized in Tables 3 and 4.

Also, transparency (haze) and Fish eye (n) of the prepared vinyl chloride resins were measured and physical properties thereof were evaluated.

For reference, measurement details are as follows.

[Thickness of foaming layer] The height of the foaming layer was measured at a distance of 10 cm using a water level indicator and was expressed as a percentage of the total weight of the reactor.

[Fish eye] 100 g of the obtained resin, 40 g of dioctyl phthalate (DOP) as a plasticizer, 1 g of barium stearate, 2 g of a lead-based stabilizer and 0.3 g of carbon black were added and kneaded in a 6-inch roll at 145 for 4 minutes to form a sheet with a thickness of 0.2 mm and the number of particles having a diameter of 10 microns or more present in an area of 100 cm² was measured.

[Transparency] 150 g of the obtained resin, 2 g of a tin-based stabilizer, 1 g of a lubricant, 1 g of a processing aid and 4 g of an impact modifier were added and kneaded in a 4-inch roll at 190 for 5 minutes, and a flat sheet having a thickness of 5 mm was produced using a 200 press. Then, transparency was measured using a Haze-Gard Plus apparatus produced by BYK Gardner.

[Melting time] 100 g of the obtained resin, 7 g of a lead-based composite stabilizer, 7 g of an acrylic impact modifier, and 6 g of calcium carbonate were mixed, 60 g of the mixture was harvested and kneaded at 165 at a speed of 40 rpm using Plastomill produced by Barbender and, at the same time, a time at which an initial maximum peak torque and a maximum broad torque were obtained was measured.

TABLE 3

| Type | Ex. 1 | Ex. 2 | Ex. 3 | Ex. 4 | Ex. 5 | Ex. 6 | Ex. 7 | Ex. 8 |
|---|---|---|---|---|---|---|---|---|
| No. of Preparation Example for antifoaming agent | Prep. Ex. 1 | Prep. Ex. 2 | Prep. Ex. 3 | Prep. Ex. 4 | Prep. Ex. 5 | Prep. Ex. 6 | Prep. Ex. 10 | Prep. Ex. 11 |
| Number of addition (times) | 2 | 2 | 2 | 2 | 3 | 3 | 2 | 2 |
| Thickness of foaming layer (%) | 0.7 | 1.2 | 0.9 | 1.5 | 1.6 | 1.8 | 1.4 | 1.3 |
| Transparency (%) | 73 | 73 | 73 | 73 | 73 | 73 | 73 | 73 |
| Fish eye (n) | 0 | 2 | 1 | 3 | 4 | 4 | 3 | 3 |
| Melting rate (sec) | 108 | 107 | 98 | 99 | 110 | 97 | 108 | 107 |

TABLE 4

| Type | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| No. of Preparation Example for antifoaming | N/A (Not Applicable) | Prep. Ex. 7 | Prep. Ex. 8 | Prep. Ex. 9 | Prep. Ex. 12 | Prep. Ex. 13 | Prep. Ex. 14 |
| Number of addition (times) | 0 | 6 | 13 | 11 | 2 | 2 | 5 |
| Thickness of foaming layer (%) | 9.5 | 3.2 | 5.2 | 1.9 | 1.4 | 1.5 | 3.1 |
| Transparency (%) | 73 | 73 | 69 | 70 | 73 | 73 | 66 |
| Fish eye (n) | 28 | 13 | 39 | 4 | 3 | 2 | 20 |
| Melting rate (sec) | 108 | 108 | 110 | 111 | 100 | 98 | 115 |

As could be seen from Tables 3 and 4 above, Examples 1 to 8 could minimize the number of addition of antifoaming agent to three times or less, as compared to Comparative Examples 1 to 6, and inhibited an increase in thickness of foaming layer to a level lower than 2%, which demonstrated that the present invention inhibited deterioration in inherent transparency of the vinyl chloride resin and reduced Fish eyes.

Furthermore, in cases in which two types of organic antifoaming agents suggested in Preparation Examples 10 to 12 were used in combination, desired qualities could be obtained, but melting time was shortened and variation of processing conditions was inconveniently required within non-preferred ranges, shown in Comparative Examples 5 and 6. However, as shown in Examples 7 and 8, the desired physical properties could be obtained and inconvenient variation in processing conditions was not required, when used in combination in an optimum range. As a result, it could be seen that this case was also preferred.

Also, it could be seen that Comparative Example 7, in which siloxane in which the value of n is 1, was used instead of the substance of Formula 1 exhibited considerable deterioration in transparency, as compared to Example 1.

Comparative Example 8

The same process as in Example 1 was repeated, except that hydrocarbon-based paraffin having 12 carbon atoms was used instead of organosiloxane. The measurement results are shown in Table 5 below.

Comparative Example 9

The same process as in Example 3 was repeated, except that phosphoric acid ($H_3PO_4$) was used instead of organophosphate. The measurement results are shown in Table 5 below.

TABLE 5

| Type | Comp. Ex. 8 | Comp. Ex. 9 |
|---|---|---|
| Substitute of antifoaming agent | Hydrocarbon-based paraffin having 12 carbon atoms | Phosphoric acid having a structure of $H_3PO_4$ |
| Number of addition (times) | 13 | 6 |
| Thickness of foaming layer (%) | 4.2 | 3.2 |
| Transparency (%) | 68 | 66 |
| Fish eye (n) | 32 | 13 |
| Melting rate (sec) | 110 | 108 |

As could be seen from Table 5, Comparative Example 8 in which hydrocarbon-based paraffin having 12 carbon atoms was used instead of the substance of Formula 1 exhibited considerably deteriorated transparency, as compared to Example 1. As could be seen from Table 5, Comparative Example 9 in which phosphoric acid having a structure of $H_3PO_4$ was used instead of the substance of Formula 2 exhibited considerably deteriorated thermal stability and transparency, as compared to Example 3.

As apparent from the fore-going, the present invention provides an antifoaming agent for a vinyl chloride resin slurry capable of preventing generation of Fish eyes and deterioration in production efficiency caused by slurry foams generated in the process of preparing vinyl chloride resins without inhibiting inherent transparency of vinyl chloride resins.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An antifoaming agent for a vinyl chloride resin slurry comprising a mixture of compounds represented by Formula 1 and by Formula 2 below:

[Formula 1]

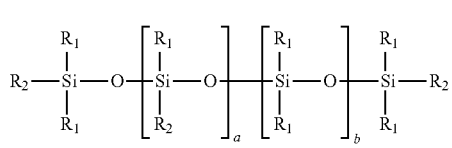

(wherein $R_1$ is an aliphatic or cycloaliphatic hydrocarbon having a $C_1$ to $C_{20}$ alkyl group, $R_2$ is independently an aliphatic or cycloaliphatic hydrocarbon having a $C_2$ to $C_{20}$ alkyl group, a is an integer of 1 to 30, which represents a polymerization degree of a structure in which $R_1$ and $R_2$ are bonded to silicon (Si), and b is an integer of 5 to 200, which represents a polymerization degree of a structure in which $R_1$ and $R_1$ are bonded to silicon (Si))

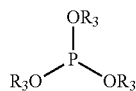
[Formula 2]

(wherein $R_3$ represents an aliphatic, cycloaliphatic or aromatic hydrocarbon having a $C_1$ to $C_{20}$ alkyl group), wherein the compound of Formula 1 and the compound of Formula 2 are mixed at a weight ratio of 9:1 to 3:7.

2. The antifoaming agent according to claim 1, wherein, in Formula 1, the number of carbon atoms in the alkyl group is an integer of 4 to 18.

3. The antifoaming agent according to claim 1, wherein, in Formula 1, a is an integer of 1 to 15.

4. The antifoaming agent according to claim 1, wherein, in Formula 1, b is an integer of 10 to 100.

5. The antifoaming agent according to claim 1, wherein, in Formula 2, the number of carbon atoms in the alkyl group is an integer of 4 to 18.

6. The antifoaming agent according to claim 1, further comprising a polyvinyl acetate compound having a partial saponification degree of 90% or less.

7. The antifoaming agent according to claim 6, wherein the partially saponified polyvinyl acetate compound has a partial saponification degree of 30% to 90%.

8. The antifoaming agent according to claim 6, wherein the partially saponified polyvinyl acetate compound has a weight average molecular weight (Mw) of 7,000 to 20,000.

9. The antifoaming agent according to claim 6, wherein a weight ratio of the at least one compound selected from the compound of Formula 1 and the compound of Formula 2, and the partially saponified polyvinyl acetate compound is 5:1 to 1:50.

10. The antifoaming agent according to claim 9, wherein the weight ratio of the at least one compound selected from the compound of Formula 1 and the compound of Formula 2, and the partially saponified polyvinyl acetate compound is 1:1 to 1:10.

11. The method of using the antifoaming agent according to claim 1, wherein the antifoaming agent for a vinyl chloride resin slurry is added when a polymerization conversion ratio is within a range of 0 to 90%.

12. The method according to claim 11 wherein the antifoaming agent for the vinyl chloride resin slurry is added during or after polymerization of the vinyl chloride resin, or during blowing down of monomers after polymerization.

13. The method of using the antifoaming agent according to claim 1 wherein the antifoaming agent for a vinyl chloride resin slurry is added such that the thickness of a foaming layer measured during polymerization does not exceed 10% of the total volume of the reactor.

14. The method according to claim 13 wherein the antifoaming agent for a vinyl chloride resin slurry is added such that the thickness of a foaming layer measured during polymerization does not exceed 2% of the total volume of the reactor.

15. The method according to claim 14 wherein the antifoaming agent for a vinyl chloride resin slurry is added at an interval of 5 to 60 minutes when the thickness of the foaming layer generated during polymerization exceeds 1% of the total volume of the reactor.

16. The method according to claim 15 wherein the antifoaming agent for a vinyl chloride resin slurry is added at an interval of 10 to 30 minutes when the thickness of the foaming layer generated during polymerization exceeds 1% of the total volume of the reactor.

17. The method according to claim 14 wherein an amount of the antifoaming agent for a vinyl chloride resin slurry is 10 to 200 ppm (part per hundred monomer), based on the vinyl chloride monomer per an input.

18. The method according to claim 17 wherein an amount of the antifoaming agent of vinyl chloride resin slurry is 10 to 100 ppm (part per hundred monomer), based on the vinyl chloride monomer per an input.

* * * * *